United States Patent [19]

Kotera et al.

[11] 4,258,264
[45] Mar. 24, 1981

[54] METHOD OF AND APPARATUS FOR READING OUT A RADIATION IMAGE RECORDED IN A STIMULABLE PHOSPHOR

[75] Inventors: Noboru Kotera; Syusaku Eguchi, both of Odawara; Junji Miyahara, Minami-ashigara; Seiji Matsumoto, Minami-ashigara; Hisatoyo Kato, Minami-ashigara, all of Japan

[73] Assignee: Fuji Photo Film Co., Ltd., Minami-ashigara, Japan

[21] Appl. No.: 57,094

[22] Filed: Jul. 12, 1979

[30] Foreign Application Priority Data

Jul. 12, 1978 [JP] Japan .................................. 53-84741

[51] Int. Cl.$^3$ ........................................... H05B 33/00
[52] U.S. Cl. ................................... 250/484; 250/327.1
[58] Field of Search ..................... 250/327.1, 337, 484

[56] References Cited

U.S. PATENT DOCUMENTS

| | | | |
|---|---|---|---|
| 3,859,527 | 1/1975 | Luckey | 250/327.1 |
| 3,975,637 | 8/1976 | Ikedo et al. | 250/337 |

*Primary Examiner*—Davis L. Willis
*Attorney, Agent, or Firm*—Gerald J. Ferguson, Jr.; Joseph J. Baker

[57] ABSTRACT

A radiation image recorded in a stimulable phosphor sheet or plate is visualized by stimulating the phosphor with stimulating rays. Being stimulated by the stimulating rays, the phosphor emits detectable light. The emitted light is detected by a photodetector. The wavelength of the stimulating rays is selected within the range of 600 to 700 nm. The wavelength of the light detected by the photodetector is selected within the range of 300 to 500 nm.

4 Claims, 16 Drawing Figures

F I G. 11
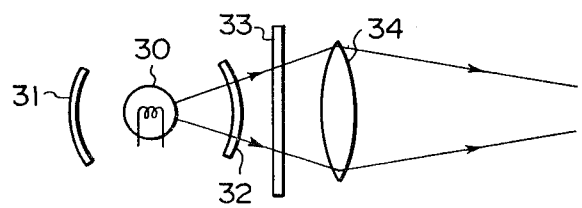
F I G. 12
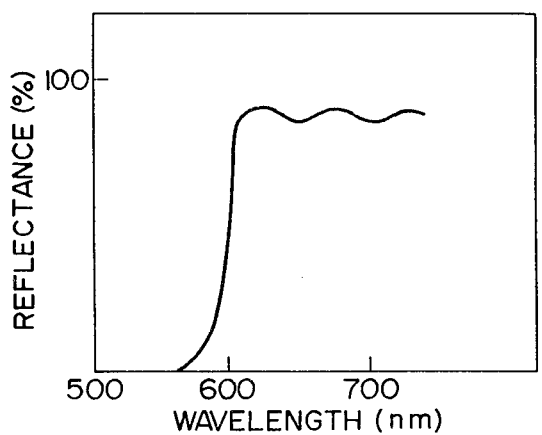
F I G. 13
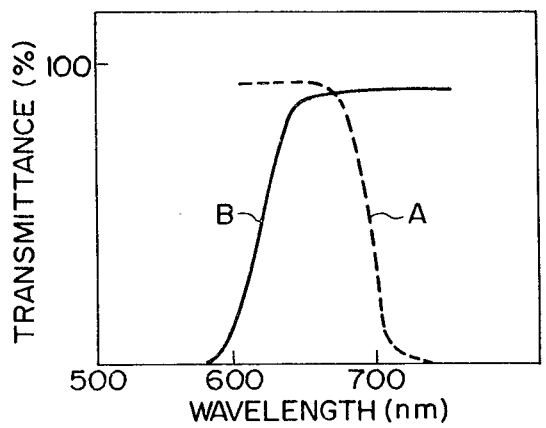

METHOD OF AND APPARATUS FOR READING OUT A RADIATION IMAGE RECORDED IN A STIMULABLE PHOSPHOR

BACKGROUND OF THE INVENTION

1. Field of the Invention

This invention relates to a radiation image read-out system for reading out a radiation image such as a radiograph recorded in a stimulable phosphor stored with radiation energy in an image-like pattern. More particularly, the present invention relates to a method of reading out a radiation image recorded in a stimulable phosphor which is used in a radiation image recording and reproducing system utilizing stimulability of a phosphor, and an apparatus for carrying out the method.

2. Description of the Prior Art

Instead of the conventional photographic system used in the medical radiography, it has been recently developed to use a stimulable phosphor as a recording medium in which a radiation image as of X-rays is first recorded by irradiating the phosphor with a radiation through an object like a human body and then stimulating the phosphor with stimulating rays like visible rays or infrared rays to cause the phosphor to emit detectable light in the pattern of the recorded image. More concretely, as shown in U.S. Pat. No. 3,859,527, a stimulable phosphor is exposed to an imagewise radiation of X-rays or the like to store or record a radiation image through an object in the form of a latent image, and then an stimulating or exciting light beam is caused to scan the stimulable phosphor to have the phosphor stimulated and emit visible light in the form of the recorded pattern. The scanned phosphor is detected by a photodetector to detect the emitted light along the scanning line. The output of the photodetector is used as an image signal to display or reproduce the recorded image in the form of a visible image.

On the other hand, it has also been known in the art in place of the conventional radiography to use a thermoluminescent phosphor as a recording medium and record a radiation image as a latent image thereon and read out the recorded image by exciting the latent image by use of heat rays. This kind of radiation image recording and reproducing system is shown in British Pat. No. 1,462,769 and Japanese Patent Laid Open No. 51 (1976)-29889. The thermo-luminescent phosphor stored with a radiation image emits light when excited by the heat rays, and the emitted light is detected by a photodetector to obtain an image signal. This system which uses thermo-luminescence is disadvantageous in that the recording medium is required to have heat resistance. In view of the required heat resistance, there are severe limitations in the kind of the adoptable phosphor and the substrate on which the phosphor is applied.

The present invention is concerned with the former type radiation image recording and reproducing system and particularly relates to a read-out method for this system. The inventors of this invention made various investigations regarding efficiency, speed and signal-to-noise ratio in the above radiation image read out process utilizing the stimulable phosphor. As a result, the following phenomena have been discovered.

(1) The efficiency of stimulation greatly depends upon the wavelength of the stimulating rays when a time has passed since recording of the radiation image. In other words, the lowering of the efficiency of stimulation or output luminance of the stimulated phosphor which is considered to be due to decay of the stored energy depends upon the wavelength of the stimulating rays used for stimulating the phosphor. In more detail, when a period has passed since recording of the radiation image, the level of output luminance of the stimulated phosphor changes with the wavelength of the stimulating rays.

(2) The response or speed of stimulation depends upon the wavelength of the stimulating rays. The speed of stimulation greatly effects on the speed of read-out of the recorded radiation image.

(3) The signal-to-noise ratio in the read-out step is greatly effected by the reflection light of the stimulating rays reflected by the surface of the phosphor and the ambient light, since the intensity of the stimulated emission is very small.

SUMMARY OF THE INVENTION

The object of the present invention is to provide a method of reading out the radiation image recorded in a stimulable phosphor with high efficiency even after several hours of preservation.

Another object of the present invention is to provide a method of reading out the radiation image recorded in a stimulable phosphor at a high speed.

Still another object of the present invention is to provide a method of reading out the radiation image recorded in a stimulable phosphor with a high signal-to-noise ratio.

A further object of the present invention is to provide an apparatus for reading out a radiation image recorded in a stimulable phosphor with high efficiency, high speed and high signal-to-noise ratio.

The method and apparatus for reading out the radiation image recorded in a stimulable phosphor in accordance with the present invention is characterized in that the wavelength of the stimulating rays and the wavelength of the light emitted by the phosphor upon stimulation are selected to effect high efficiency of stimulation, high speed of stimulation and readout and high S/N ratio on the basis of said discoveries. The wavelength of the stimulating rays is selected within the range of 600 to 700 nm, and that of the detected light is selected within the range of 300 to 500 nm.

The stimulating rays having a wavelength with said range can be obtained by a ray source which generates rays having a spectral distribution within said range, or by a combination of a ray source which generates rays having a spectral distribution covering at least a part of said range and an optical filter to cut the light having a wavelength beyond said range. For example, as the stimulating rays can be used a Kr laser (647 nm), light emitted by a light emitting diode (640 nm), a He-Ne laser (633 nm), and a rhodamine B dye laser (610–680 nm). Further, a combination of a band filter which transmits light having a wavelength within said range and a tungsten-iodine lamp can also be used as the stimulating ray source.

The detecting means used for detecting the light emitted by the stimulated phosphor having a wavelength within the range of 300 to 500 nm may be a photomultiplier which has a spectral sensitivity peak within the range. Further, it is necessary that the detecting means does not detect any light having a wavelength beyond said range in order to make the S/N ratio as high as possible. The stimulating rays have a wavelength within the range of 600 to 700 nm. Therefore, in order to prevent the detecting means from detecting a part of the stimulating rays, the range of the wavelength of the light detected by the detecting means must not overlap with the range of the wavelength of the stimulating rays. Further, the detecting means is also required not to detect the ambient light. In view of these requirements, the wavelength of the light to be detected by the detecting means should preferably be within the range of 300 to 500 nm.

The phosphor to be used in this invention is a stimulable phosphor which emits light of intensity corresponding to the energy stored therein when stimulated with stimulating rays. The stimulable phosphor is first exposed to imagewise radiation and absorbs radiation energy. As the radiation can be employed visible light, ultraviolet rays, infrared rays, X-rays, gamma rays, beta rays, alpha rays, neutrons, etc. The detailed examples of the stimulable phosphor will be described hereinafter.

The present invention will be described in more detail with reference to the accompanying drawings as follows.

BRIEF DESCRIPTION OF THE DRAWING

FIG. 11 is a side view showing an example of the stimulating ray source, FIG. 12 is a graph showing the spectral reflectivity of the mirror used in the stimulating ray source, and FIG. 13 is a graph showing the spectral transmittivity of the filter used in the stimulating ray source.

DESCRIPTION OF THE PREFERRED EMBODIMENTS

Now the invention will be described in detail with reference to particular embodiments thereof. Before describing the embodiments in detail, the present invention will be further described in greater detail with reference to several results of tests to explain said discoveries regarding influence of the wavelength of the stimulating rays and the detected light upon efficiency, speed and S/N ratio of the image read-out system.

Figure 1:
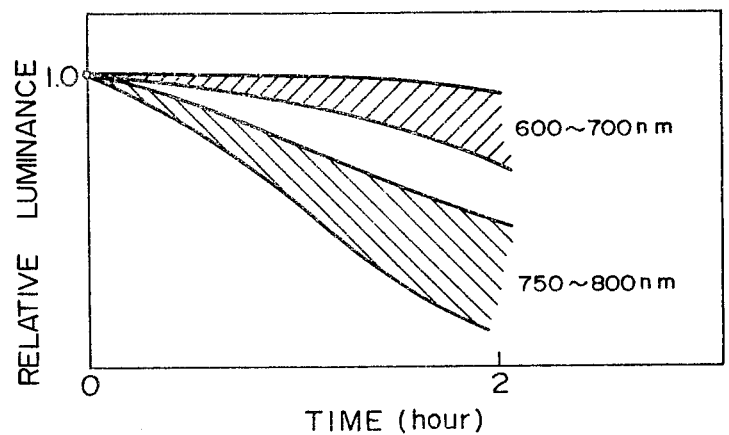
FIG. 1 is a graph showing the relationship between the relative luminance of the stimulated emission and the time which has lapsed since recording of the radiation image, and further the relationship between the decay of energy represented by the above relationship and the wavelength of the stimulating rays.
Figure 2:
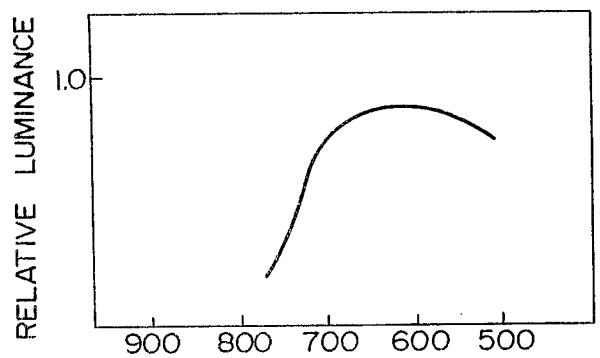
FIG. 2 is a graph showing the relationship between the relative luminance of the stimulated emission and the wavelength of the stimulating rays.

FIG. 1 shows the relationship between the relative luminance of the stimulated emission and the time which has lapsed since recording of the radiation image, which shows the decay of energy stored in the stimulable phosphor. This graph shows the luminance of the stimulated emission or the output luminance of the stimulated emission which is measured after a time has lapsed since the recording of the radiation image for different wavelength of stimulating rays. When 2 hours has lapsed since the recording, the output luminance is reduced to less than half of the initial luminance when stimulated with stimulating rays having a wavelength of 750 to 800 nm. On the other hand, when the stimulable phosphor is stimulated with stimulating rays having a wavelength of 600 to 700 nm, the output luminance is only reduced to more than 80% of the initial luminance. This means that the energy decay at the level where the stored energy is stimulated by the rays of 750–800 nm is much greater than that of 600–700 nm. As the result, it is very advantageous to stimulate the phosphor stored with the radiation image with stimulating rays having a wavelength within the range of 600 to 700 nm from the viewpoint of the period of preservation. The relationship between the luminance and the wavelength is clearly shown in FIG. 2, from which it is observed that the output luminance is comparatively high in the range of 600 to 700 nm.

Figure 3:
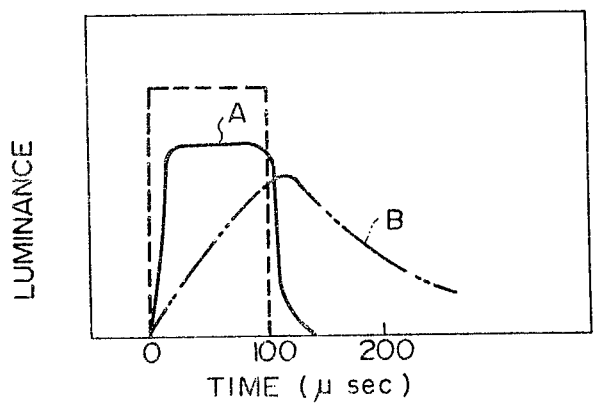
FIG. 3 is a graph showing the response of the stimulation of the stimulable phosphor stimulated by different stimulating rays.

The response of stimulation is shown in FIG. 3. The luminance of the stimulated emission is shown at A for a He-Ne laser (633 nm) and at B for a $CO_2$ laser (10600 nm). As clearly observed in FIG. 3, the response of stimulation of the phosphor when stimulated by a He-Ne laser beam is much higher than that by a $CO_2$ laser beam. Further, in case of the $CO_2$ laser, the phosphor is heated and the luminance is reduced. For instance, according to the tests conducted by the inventors, the luminance was reduced by a quarter when the phosphor was scanned with a $CO_2$ laser beam having a diameter of $100\mu$.

Regarding the signal-to-noise ratio (S/N), the stimulating rays must be carefully prevented from being detected by the detecting means which should detect the stimulated emission or light emitted by the phosphor, because the ratio of the stimulating energy to the emitted energy is as high as $10^4:1$ to $10^6:1$. Since the stimulating energy is markedly high in comparison with the emitted energy, the S/N ratio is greatly affected by the stimulating rays if the stimulating rays are received by the detecting means. Therefore, it is effective to improve the S/N ratio by preventing the stimulating rays from getting into the detecting means. The light of the wavelength of 300 to 500 nm as mentioned hereinbefore can be obtained by selecting the kind of the stimulable phosphor which is stimulated and emits the light, or by combining the phosphor which has a peak of spectral distribution within the range and a filter which cuts the light of the wavelength beyond the range.

As the stimulable phosphor which emits light of the wavelength within the range of 300 to 500 nm when stimulated with stimulating rays can be used the following phosphors. The range of wavelength of the light emitted thereby is indicated in the parentheses.

LaOBr:Ce,Tb (380–420 nm), SrS:Ce,Sm (480–500 nm), SrS:Ce,Bi (480–500 nm), BaO:SiO$_2$:Ce (400–460 nm), BaO.6Al$_2$O$_3$:Eu (420–450 nm), BaFBr:Eu (390–420 nm), (0.9Zn, 0.1Cd)S:Ag (460–470 nm), BaFCl:Eu (390–420 nm).

Figure 4A:
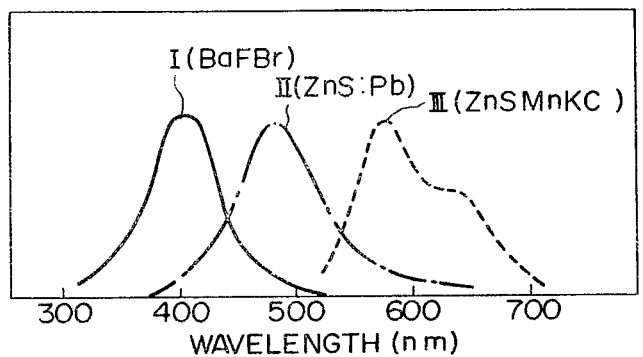
FIG. 4A is a graph showing the spectral distribution of the stimulated emission of various stimulable phosphors.
Figure 4B:
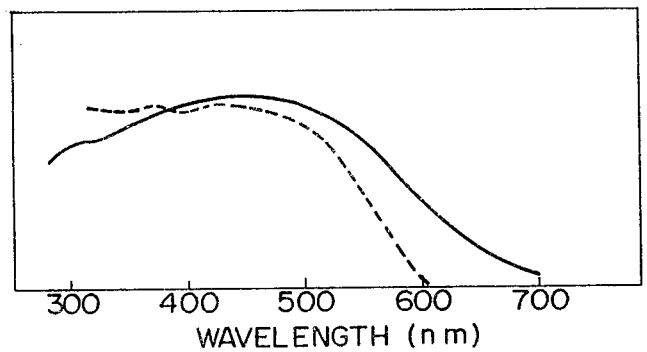
FIG. 4B is a graph showing the spectral sensitivity of the photomultiplier and the spectral transmittivity of an optical filter.
Figure 4C:
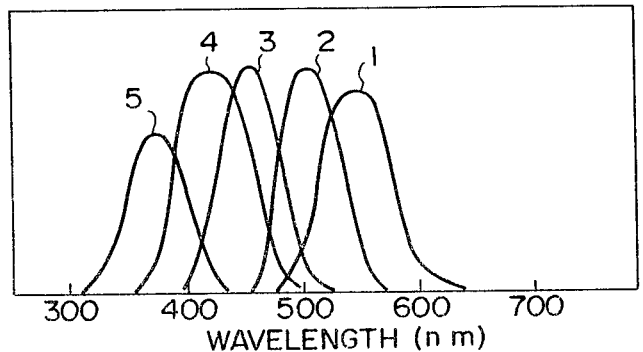
FIG. 4C is a graph showing the spectral transmittivity of various kinds of optical filters.
Figure 4D:
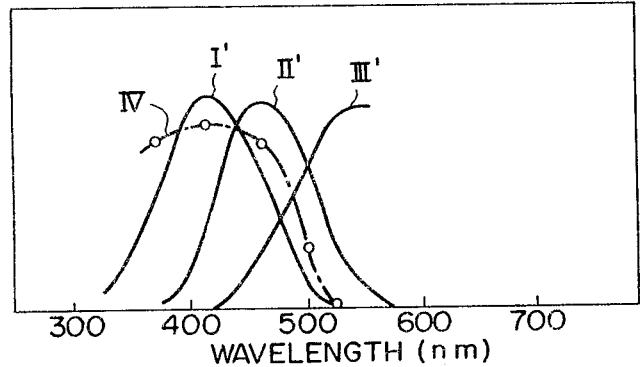
FIG. 4D is a graph showing the spectral distribution of the finally detected signal by use of various combinations of the photodetectors and the filters.

Referring to FIGS. 4A to 4D, when the output luminance of stimulated emission of the phosphors I (BaFBr), II (ZnS:Pb) and III (ZnS:MnKCl) having spectral distribution of emission as shown in FIG. 4A is detected by a photomultiplier through a filter which have spectral sensitivity and spectral transmittivity as shown in FIG. 4B by solid line and broken line, respectively, the light having the spectral distributions as shown in FIG. 4D at I′, II′ and III′ can be finally detected. The light detected by the detector includes a part of the stimulating rays as noise. FIG. 4C shows the spectral transmittivity of various kinds of filters 1 to 5. When these filters are used in front of the photomultiplier, and the output of the photomultiplier is compared with the output thereof obtained without the filter when only the background light or the stimulating ray is detected, the ratio of the output with the filter to the output without the filter becomes as shown in FIG. 4D at IV. In other words, the curve IV in FIG. 4D represents the S/N ratio for the varied wavelength of the light detected by the detecting means. From FIG. 4D, it is obvious that the S/N ratio is markedly lowered or becomes almost zero over the wavelength of 500 nm. This is, of course, considered to be based on the wavelength of the stimulating rays having spectral distribution from about 600 nm.

Figure 5:
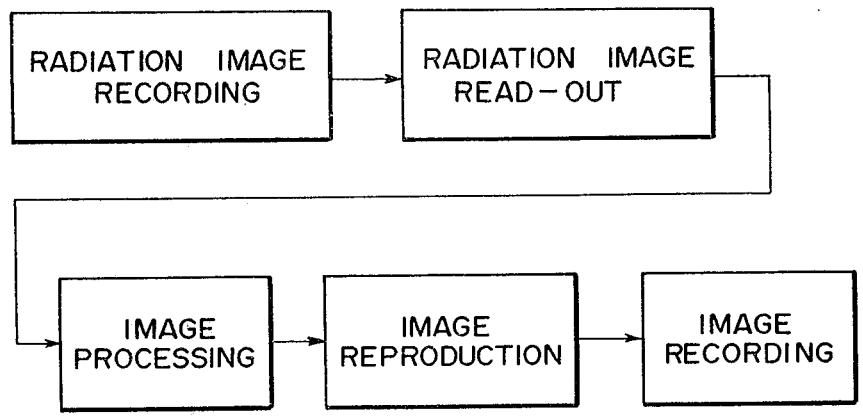
FIG. 5 is a block diagram showing the basic process of the radiation image recording and reproducing system with which the image read-out system of this invention is concerned.

FIG. 5 shows the whole system of the radiation image recording and reproducing method and apparatus with which the present invention is concerned. Referring to FIG. 5, a radiation image of an object is first recorded in a stimulable phosphor plate or sheet. The radiation energy is stored in the trap level of the stimulable phosphor. Then, the phosphor plate or sheet is subjected to stimulating rays having a wavelength of 600 to 700 nm and the trapped energy is released in the form of light having a wavelength of 300 to 500 nm. The emitted light is detected by a photodetector such as a photomultiplier or a photodiode. Thus, the radiation image is read out. The output signal of the detector is processed through an image signal processing circuit or computer to delete noise, to improve contrast, and to enhance the level. Further, in the signal processing step, the signal of the image over a predetermined frequency is cut out in order to obtain desired resolution. For instance, when the phosphor plate or sheet has a size of 40 cm×40 cm and is subjected to scanning of a flying spot having a diameter of 100μ for about 5 minutes, the scanning time for one picture cell becomes about 20 seconds. Therefore, the amplifier does not need frequency of 50 KHz, and accordingly, the signal of frequency over 50 KHz is cut out.

Further, in order to reduce the noise, the output signal of the photodetector is integrated for every picture cell and the integrated signal is used as the image signal. In addition, the output signal of the photodetector is log-converted to reduce the range of signal to improve the S/N ratio. The amplified signal level is changed to make the portion desired to be observed have a desirable contrast or to make the different portions have clear boundaries.

After the image signal processing, the signal is transmitted to a CRT for display or image scanning system for recording the image on a paper or the like. For instant, the processed image signal is displayed with a CRT for observation. The processed image signal may be used for recording the image on a plastic plate, a photographic film or a paper by use of a laser beam scanning system. It is also possible to take a photography of the image displayed on the CRT.

Figure 6:
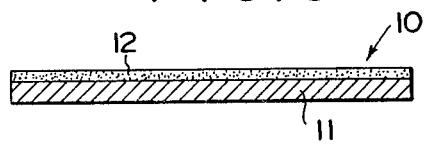
FIG. 6 is a cross-sectional view of a stimulable phosphor plate used in this invention.

FIG. 6 shows an example of the stimulable phosphor plate 10 which consists of a substrate 11 and a phosphor layer 12 disposed thereon. As the substrate 11, a polyethylene sheet having a thickness of 100 to 250μ, an aluminium sheet having a thickness of 0.5 to 1 mm, or a glass plate having a thickness of 1 to 3 mm can be used. The substrate may or may not be transparent. When the substrate is transparent, the phosphor layer can be exposed to the stimulating rays at both surfaces.

The phosphor layer can be composed of any of the said stimulable phosphors which emits light of the wavelength within the range of 300 to 500 nm. The phosphor is applied on the substrate 11 in the thickness of 50 to 1000μ.

Figure 7:
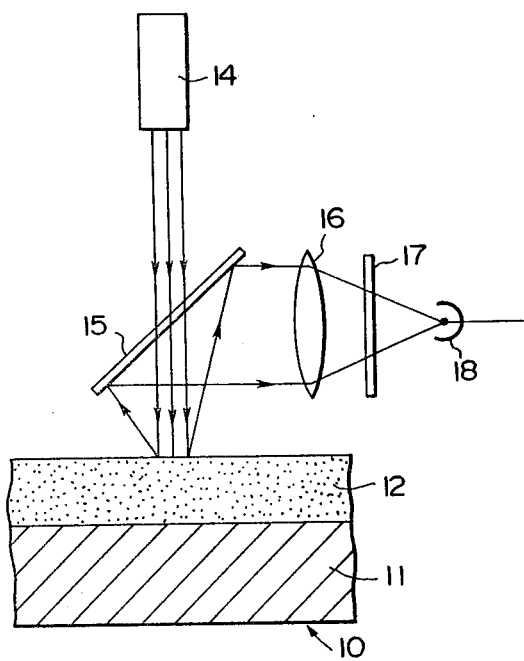
FIG. 7 is a side view of an image read-out device in accordance wth an embodiment of the present invention.
Figure 8:
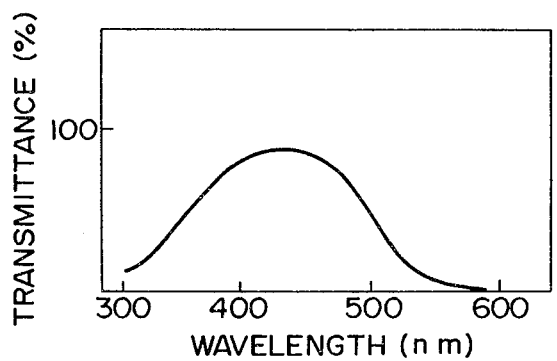
FIG. 8 is a graph showing the spectral transmittivity of the filter to be used with a photodetector in this invention.

FIG. 7 shows an embodiment of a radiation image read out apparatus in accordance with the present invention. As a stimulating ray source 14 is used a He-Ne laser source which emits a laser beam having a wavelength of 633 nm. The stimulating rays emitted by the laser source 14 impinges upon the phosphor layer 12 through a semi-transparent mirror 15. The stimulating rays in the form of a laser beam have a diameter of 50 to 300μ because the diameter cannot be made smaller than 50μ and should not be larger than 300μ to obtain satisfactory resolution. The laser beam scans the phosphor plate 10 by means of a scanning mirror or the like. The phosphor layer 12 emits light having a wavelength within the range of 300 to 500 nm upon stimulation by the laser beam. The stimulated light is reflected by the semi-transparent mirror 15 and is focused on a photodetector 18 through a lens 16 and a filter 17. The surface of the phosphor layer 12 reflects a part of the laser beam. The laser beam reflected by the surface of the phosphor layer 12 is cut out by the filter 17 so that the detector 18 may not receive the laser beam. Since the wavelength of the laser beam which is within the range of 600–700 nm is different from that of the light emitted by the phosphor layer 12 which is within the range of 300–500 nm, the S/N ratio can be maximized by using the filter 17 which transmits the light emitted by the phosphor layer 12 but intercepts the stimulating rays. The spectral transmittivity of the filter 17 is shown in FIG. 8.

Figure 9:
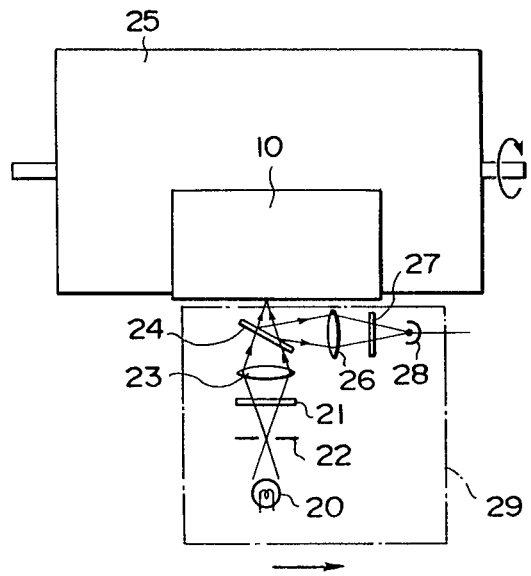
FIG. 9 is a schematic side view of a drum scanning type read-out device in accordance with another embodiment of the present invention.
Figure 10:
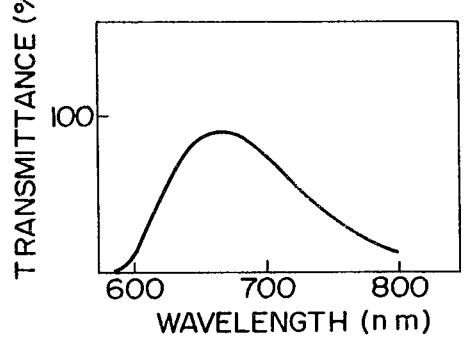
FIG. 10 is a graph showing the spectral transmittivity of the filter to be used with a stimulating ray source.

FIG. 9 shows another embodiment of the radiation image read out apparatus in accordance with this invention. As the stimulating ray source is used a tungsten lamp 20. Since the tungsten lamp 20 includes near ultraviolet rays and infrared rays in addition to the visible rays, a filter 21 which has a spectral transmittivity as shown in FIG. 10 is located in front of the tungsten lamp 20 to cut light components having a wavelength shorter than 600 nm and longer than about 800 nm. A pin hole 22 is provided in front of the lamp 20 to focus the light from the lamp 20. Thus, the light passing through the filter 21 is made to have a wavelength almost within the range of 600 to 700 nm and is focused on a phosphor plate 10 through a focusing lens 23 and a semi-transparent mirror 24. The phosphor plate 10 is mounted on a drum 25 which is rotatable in the direction of scanning. The light emitted by the stimulated phosphor plate 10 is reflected by the semi-transparent mirror 24 and received by a photodetector 28 through a focusing lens 26 and a filter 27.

The optical system including the tungsten lamp 20 and the lenses, filters and the mirror are all mounted on a head 29 which is moved along the drum 25 as the drum 25 rotates. Alternatively, the head 29 may be fixed stationary and the drum 25 may be moved and rotated to effect the two-dimensional scanning.

FIG. 11 shows another example of the stimulating ray source system in which a tungsten lamp 30 is used together with a concave mirror 31 located therebehind. The concave mirror 31 is made of a dichroic mirror having spectral reflectivity as shown in FIG. 12. In front of the tungsten lamp 30 is located a dichroic mirror 32 having spectral transmittivity as shown in FIG. 13 at curve A. A filter 33 having spectral transmittivity as shown at curve B in FIG. 13 is located behind the dichroic mirror 32 to only pass the light having wavelength of 600 to 700 nm. The light passing through the two filters 32 and 33 is focused by the lens 34 to form a spot on the surface of the phosphor layer of the phosphor plate.

We claim:

1. A method of reading out a radiation image stored in a stimulable phosphor member comprising the steps of stimulating the phosphor stored with the radiation image with stimulating rays to cause the phosphor to emit detectable light, and detecting the emitted light with a photodetector characterized in that the wavelength of said stimulating rays is within the range of 600 to 700 nm, and that the wavelength of said light detected by the photodetector is within the range of 300 to 500 nm.

2. An apparatus for reading out a radiation image stored in a stimulable phosphor member comprising a stimulating ray source for generating stimulating rays to which the stimulable phosphor stored with a radiation image is exposed, and a detecting means for detecting the light emitted from the stimulable phosphor stimulated by said stimulating rays characterized in that the wavelength of said stimulating rays generated by the stimulating ray source is within the range of 600 to 700 nm, and that said detecting means detects the light having a wavelength within the range of 300 to 500 nm.

3. An apparatus for reading out a radiation image stored in a stimulable phosphor as defined in claim 2 wherein said stimulating ray source is a He-Ne laser source.

4. An apparatus for reading out a radiation image stored in a stimulable phosphor as defined in claim 2 or 3 wherein said detecting means comprises a photodetector and an optical filter which only transmits light having a wavelength within the range of 300 to 500 nm.

* * * * *